Aug. 2, 1949.          L. WILSON                2,478,147
                ELECTRICAL PROTECTIVE SYSTEM
                    Filed May 19, 1948
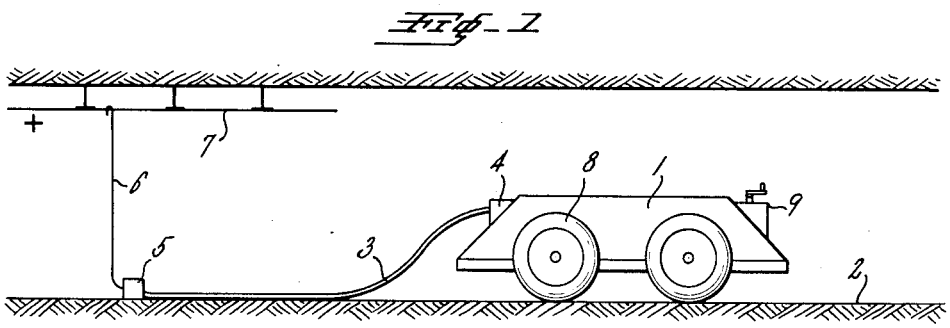
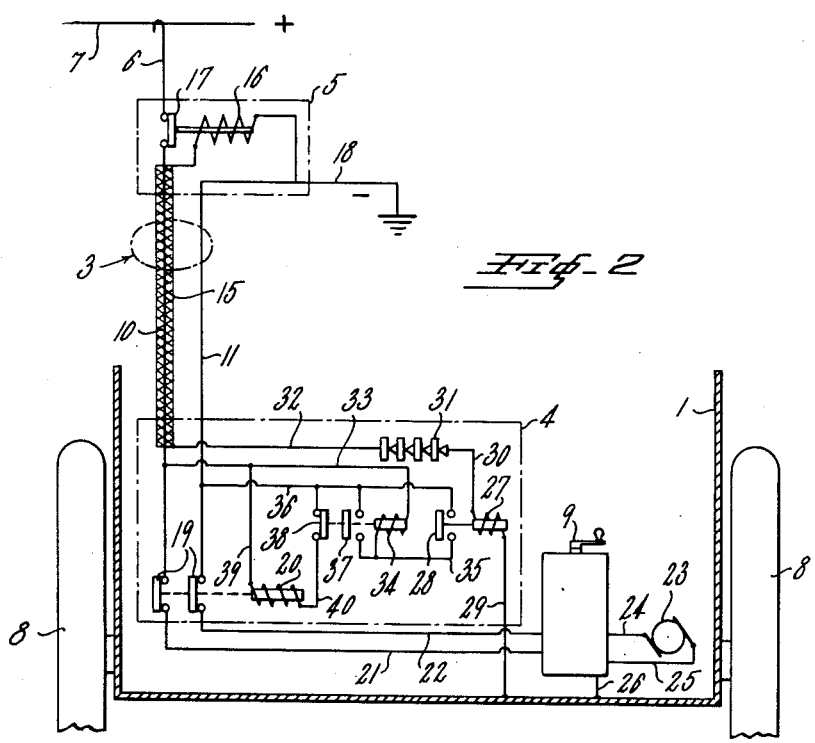
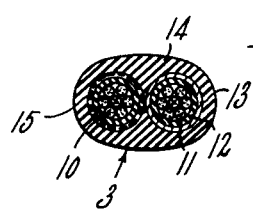
INVENTOR.
LEONARD WILSON, deceased,
by FRANCES J. WILSON, administratrix
BY
    Henry P. Truesdell
            ATTORNEY Patented Aug. 2, 1949

2,478,147

UNITED STATES PATENT OFFICE 2,478,147

ELECTRICAL PROTECTIVE SYSTEM

Leonard Wilson, deceased, late of Salt Lake City, Utah, by Frances S. Wilson, administratrix, Salt Lake City, Utah, assignor to United States Rubber Company, New York, N. Y., a corporation of New Jersey Application May 19, 1948, Serial No. 28,039

7 Claims. (Cl. 175—294)

1

This invention relates to an electrical protective system and more particularly to a protective system for electrically operated mining machinery and the associated trailing power supply cable.

It is an object of the invention to provide a new and improved protective system to reduce the hazards of explosions in mines caused by arcing of the electric power system when breaks in the cable or faults in the mining machinery occur.

Another object of the invention is to prevent an arc from developing in the cable when the latter is damaged by accidental cuts or bruises.

Still another object of the invention is to provide means for cutting off the power supply in the event that a ground fault or short circuit develops in the electrically operated mining machine.

A further object is to provide a new and improved electric protective system which may be readily incorporated into existing mine power feeding systems without extensive modification thereof and which is simple and reliable in operation.

In the accompanying drawing,

Fig. 1 is a diagrammatic view of a mining machine connected to a power supply which includes the electrical protective system of the instant invention;

Fig. 2 is a schematic wiring diagram of the electrical protective system; and

Fig. 3 is a cross sectional view of an electrical cable utilized in the protective system.

Referring to Fig. 1 of the drawing, a mining machine 1 such as a locomotive, drill, cutter, or the like, is illustrated as operating in a lead or corridor 2 of a mine. Electric power is supplied to the machine by means of a flexible cable 3. One end of the cable 3 is connected to a control box or electrical contactor 4 carried by the mining machine while the other end is secured to a circuit breaker 5. Electric power is supplied to the circuit breaker by means of a pick-off rod 6 which is hung at any convenient point on the main overhead power supply line 7. In actual operation, the mining machine 1 travels along the corridor of the mine to the working faces and the trailing power supply cable 3 may extend over many hundreds of feet to supplement the main power supply line 7 in supplying power to remote

2 corners of the mine. The mining machine illustrated is provided with rubber pneumatic tires 8 and is operated by a controller 9. However, the electrical protective system may be used equally as well with mining machines or locomotives which travel on a system of rails.

In use, the trailing cable 3 is subject to considerable abuse due to the fact that it is frequently twisted or bent around corners in the corridor; moreover, there is some likelihood that it may be accidentally cut or damaged by the passing of other mine vehicles, by falling rock, or the like. It is one of the purposes of the instant invention to prevent arcing in the cable when such an accident occurs and thereby remove one possible cause of a mine explosion. In addition, the electrical protective system is so arranged that it will operate to interrupt the power supply in the event that the mining machine 1 becomes charged with current due to a fault or short circuit in the electrical wiring on the mining machine.

In Fig. 3, the cable 3 is illustrated as including conductors 10 and 11 each being insulated with a rubber jacket 12 and a braid 13 of any suitable fibrous material, such as cotton or rayon. The individually insulated conductors are cabled together in an outer jacket 14 of rubber, or other suitable insulating material. One of the conductors, in this case the conductor 10, which is connected to the positive supply line 7 of the D. C. power supply system, is provided with a shield 15. The shield may be formed of any suitable conductive material overlying the insulation on the conductor 10 but it is preferred to construct it of fine copper wire interwoven with the strands of the fabric braid 13. The shield is constructed with sufficient current carrying capacity to operate the circuit breaker 5 when a voltage is impressed thereon, in a manner now to be described.

Referring to Fig. 2, the circuit breaker 5 includes an operating coil 16 for opening normally closed contacts 17 through which power is fed from the take-off rod 6 to the positive conductor 10 of the power supply cable 3. One end of the relay coil 16 is electrically connected to the shield 15 which surrounds the positive conductor of the cable; the other end is connected to the negative conductor 11 of the cable, the two parts being connected to ground through a conductor 18.

The ground connection forms the negative or return side of the power supply. The circuit breaker 5 is of the high speed type and operates when a small current and voltage are applied to the operating coil by the shield 15 when a break in the cable occurs. One suitable form of circuit breaker is of the well known de-ion type. Many existing mine installations supply power to the mine machinery at from 200 to 400 volts D. C. Under such conditions the circuit breaker 5 is designed to operate in approximately 1/120 of a second when a current of approximately three amperes is applied to the operating coil at a potential of from 2 to 6 volts. However, it should be understood that the power supply voltage and the operating voltages and characteristics of the circuit breaker 5 may be varied at will depending upon the particular installation.

Operation of the circuit breaker 5 takes place when voltage appears in the shield 15 indicating damage to the cable. It frequently happens that the cable may be cut by passing mine equipment, or it may be bruised or cut by falling rock, in which case current passing through the positive conductor 10 will leak to or charge the shield 15 so that voltage is applied to the circuit breaker coil. The speed of operation of the circuit breaker is such that power will be removed from the cable 3 before arcing takes place at the damaged point of the cable thereby reducing the hazards of an explosion which might be ignited by an arc.

The conductors 10 and 11 of the power supply cable are connected to the controller 9 of the mining machine through the normally closed contacts 19 of a main power supply relay 20 and conductors 21 and 22. The mining machine drive motor 23, which may be of any conventional type, is connected to the controller 9 by conductors 24 and 25. It should be manifest that the controller 9 is used to control the speeds of operation of the mining machine both in a forward and reverse direction. The controller is grounded to the frame of the mining machine by a conductor 26.

In the event that the mining machine frame 1 becomes electrically charged due to a fault or short circuit in any of the electrical equipment or wiring carried by the machine, means is provided to cut off the power supply as soon as such a fault starts. To this end, the control box or contactor 4 is provided with a ground fault relay 27 having normally open contacts 28. One end of the coil of relay 27 is connected by a conductor 29 to the frame of the mining machine; the other end is connected by a conductor 30 to a one-way electric check valve or rectifier 31. One suitable form of rectifier may be of the well known copper-oxide type. In turn, the rectifier is connected by a conductor 32 to the cable shield 15. The arrangement is such that any voltage appearing on the mining machine frame 1 will be fed by conductor 29 to the coil of the relay 27, conductor 30, the rectifier 31, conductor 32 to the shield 15 of the cable, and then through the circuit breaker coil 16 to the ground connection 18. On the other hand, any voltage appearing on the shield 15 due to a break in the cable 3, cannot be applied to the relay 27 because the rectifier passes current in one direction only. When a fault occurs in the wiring on the machine and the relay 27 is energized the contacts 28 close so that current flows from the positive conductor 10 through a conductor 33 to energize an auxiliary relay 34 thence through a conductor 35, the closed contacts 28, a conductor 36 to the return negative conductor 11. When relay 34 picks up it closes its normally opened contacts 37 to form a holding circuit for the coil of the relay 34 across the conductors 33 and 36; at the same time, it opens the normally closed contacts 38 so that the circuit to the operating coil of the power supply relay 20 is interrupted. Power is supplied to the coil of relay 20 from the positive conductor 10 through conductor 33, a conductor 39, the coil of the relay, a conductor 40, the normally closed contacts 38, conductor 36 and thence to the negative return conductor 11. In this way, when the ground fault relay 27 is operated the relay 20 is deenergized to open the contacts 19 in the main power supply line to the machine controller 9. The arrangement is such that when the machine frame becomes charged with current due to a short circuit or fault appearing in the apparatus mounted on the machine, the main relay 20 is deenergized to interrupt the power supply to the machine. In most instances, the circuit breaker 5 at the end of cable 3 will not operate due to the resistance to current flow interposed by the rectifier 31 and shield 15. The ground fault relay 27, the auxiliary relay 34 and the main power relay 20 operate with a speed such that the power supply is interrupted before any hazardous arcing can occur at the fault point in the electrical wiring system on the machine.

One advantage of the invention is that a ground connection at the machine is not relied upon to clear a short circuit occurring in the machine. Such ground connections are uncertain and may result in building up a voltage on the machine which would be dangerous to the operator. Moreover, such a ground connection permits current flow to ground which might cause arcing resulting in an explosion thus nullifying the safety objective. Instead, the protective system of the instant invention cuts off the power supply when a short circuit occurs. This permits the electrical protective system to be utilized on mining machines operating on rubber tires which insulate the machine from ground. But the system may be used equally as well on machines utilizing a railway track system of travel.

Another advantage is that the electrical equipment on the mining machine is not energized until the proper electrical connection is made at the circuit breaker end of the cable. This means that the ground connection 18 and the connection to the power supply wire 7 must both be made before the equipment may be operated. This follows from the fact that relay 20 will not pick up to close the line contacts 19 until power is supplied by the cable 3.

As already mentioned, any fault or short circuit appearing in the cable 3 operates the circuit breaker 5 but the voltage appearing in the shield 15 cannot be applied to the relay 27 due to the blocking action of the one-way rectifier 31. At the same time, the rectifier permits a circuit through the relay 27 to be closed when voltage appears on the frame of the machine to open the line contacts 19. In operation, therefore, when circuit breaker 5 trips the operator knows that the fault is located along the length of the cable 3; when relay 20 trips, the operator knows the fault resides in the machine so that a long inspection trip of the cable is unnecessary. Another advantage of connecting the shield 15 to the rectifier through the conductor 32 is that a definite electrical connection must be made to the end of the shield 15 exposed within the contactor 4 thereby obviating any possibility of the shield being inadvertently grounded to the frame of the machine or the frame of the contactor 4.

Having thus described the invention, what is claimed and is desired to be protected by Letters Patent is:

1. An electrical protective system for an electrically operated machine adapted to be connected to a power supply line and having a conductive frame, comprising, in combination, a cable for conducting electric current from the supply line to the machine, one of the conductors of said cable being provided with a conducting shield, a circuit breaker electrically connected to said shield and being responsive to the flow of current therein for interrupting the power supply to said cable, circuit interrupting means electrically connecting said cable to the machine, a relay connected between said shield and the frame of the machine for operating said circuit interrupting means and a rectifier connected between said relay and shield, said rectifier passing current when a voltage appears on the machine frame to operate said relay, said rectifier preventing operation of said relay when a voltage appears on said shield.

2. An electrical protective system for electrically operated machines and the current supply system therefor comprising, in combination, a shielded cable for supplying current to the machine, a circuit breaker electrically connected to the cable shield for interrupting the current supply to said cable when a stray voltage appears on the shield, circuit interrupting means electrically connecting said cable to the machine, a relay electrically connected to the machine for operating said circuit interrupting means, and an electric check valve electrically connecting said relay to the cable shield, said valve passing current in one direction when a stray voltage appears on the machine to operate said relay to interrupt the current supply to the machine, said valve preventing operation of said relay when a stray voltage appears on the cable shield.

3. An electrical protective system for electrically operated machines and the current supply system therefor comprising, in combination, a shielded cable for supplying current to the machine, a circuit breaker electrically connected to the cable shield for interrupting the current supply to said cable when a stray voltage appears on the shield, circuit interrupting means electrically connecting said cable to the machine, said means including an operating coil electrically connected to the machine, and an electric check valve electrically connecting said coil to the cable shield, said valve passing current in one direction when a stray voltage appears on the machine to operate said circuit interrupting means, said valve preventing operation of said coil when a stray voltage appears on the cable shield.

4. An electrical protective system for electrically operated machines and the current supply system therefor comprising, in combination, a cable for conducting electric current from the supply system to the machine, one of the conductors of said cable being provided with a conducting shield, a circuit breaker electrically connected to said shield for interrupting the current supply to said cable when a stray voltage appears on said shield, a circuit interrupter electrically connected to and closed by energization of said cable for electrically connecting said cable to the machine, control means electrically connected to the machine frame for opening said interrupter and an electric check valve electrically connecting said control means to said shield, said valve passing current in one direction when a stray voltage appears on the machine to operate said control means to interrupt the current supplied to the machine, said valve preventing operation of said control means when a stray voltage appears on the cable shield.

5. An electrical protective system for electrically operated machines and the current supply system therefor comprising in combination, a cable for conducting electric current from the supply system to the machine, one of the conductors in said cable being provided with a conducting shield, a circuit breaker electrically connected to said shield for interrupting the current supply to said cable when a voltage appears on said shield, a circuit interrupter electrically connected to and closed by energization of said cable for electrically connecting said cable to the machine, means including a one-way electric check valve for opening said circuit interrupter when a stray voltage appears on the machine but preventing operation of said circuit interrupter when a voltage appears on the cable shield, and means for holding said circuit interrupter in open position until said cable is de-energized.

6. An electrical protective system for an electrically operated mining machine and the current supply system therefor comprising, in combination, a cable having a shielded conductor adapted to be connected to the machine and a second conductor connected to ground, a circuit breaker electrically connected between the shield and said second conductor and being responsive to a fault voltage on the shield to interrupt the current supply to said cable, a circuit interrupter having normally open contacts for connecting the cable conductors to the machine, and an operating coil connected across said conductors to close said contacts upon energization of said cable, control means electrically connected to said shield and to the machine for breaking the circuit to said coil to open said contacts when a fault voltage appears on the machine frame, and means to prevent operation of said control means when a fault voltage appears on said cable shield.

7. An electrical protective system for an electrically operated mining machine and the current supply system therefor comprising, in combination, a cable having a shielded conductor adapted to be connected to the machine and a second conductor connected to ground, a circuit breaker electrically connected between the shield and said second conductor and being responsive to a fault voltage on the shield to interrupt the current supply to said cable, a circuit interrupter having normally open contacts for connecting the cable conductors to the machine, an operating coil connected across said conductors to close said contacts upon energization of said cable means including a relay electrically connected to said shield and to the machine for breaking the circuit to said coil to open said contacts when a fault voltage appears on the machine frame and a rectifier in the connection between the relay and shield to prevent operation of said relay when a fault voltage appears on said cable shield.

FRANCES S. WILSON,
*Administratrix of the Estate of Leonard Wilson, Deceased.*

No references cited.